US010695869B2

(12) United States Patent
Pluss et al.

(10) Patent No.: US 10,695,869 B2
(45) Date of Patent: Jun. 30, 2020

(54) PROCESS TO PRODUCE A WORKPIECE SURFACE ON A ROD-SHAPED WORKPIECE (71) Applicant: EWAG AG, Etziken (CH)

(72) Inventors: Christoph Pluss, Burgdorf (CH); Bruno Frei, Thierachern (CH); Claus Dold, Zurich (CH); Maximilian Warhanek, Zurich (CH); Christian Walter, Schaffhausen (CH)

(73) Assignee: EWAG AG, Etziken (CH)

( * ) Notice: Subject to any disclaimer, the term of this patent is extended or adjusted under 35 U.S.C. 154(b) by 736 days.

(21) Appl. No.: 15/399,850

(22) Filed: Jan. 6, 2017

(65) Prior Publication Data
US 2017/0113304 A1   Apr. 27, 2017

Related U.S. Application Data (63) Continuation-in-part of application No. PCT/EP2015/062898, filed on Jun. 10, 2015.

(30) Foreign Application Priority Data

Jul. 9, 2014  (DE) .......................... 10 2014 109 613

(51) Int. Cl.
*B23K 26/364* (2014.01)
*B23K 26/0622* (2014.01)
(Continued)

(52) U.S. Cl.
CPC ........ *B23K 26/364* (2015.10); *B23K 26/0622* (2015.10); *B23K 26/082* (2015.10);
(Continued)

(58) Field of Classification Search
CPC .... B23K 26/364; B23K 26/40; B23K 26/082; B23K 26/0861; B23K 26/0622; B23K 26/0823
See application file for complete search history.

(56) References Cited

U.S. PATENT DOCUMENTS 4,970,600 A * 11/1990 Garnier .............. B23K 26/0853
                                                    219/121.68
8,872,065 B2 * 10/2014 Pluss .................. B23K 26/0823
                                                    219/121.7
(Continued)

FOREIGN PATENT DOCUMENTS

DE     199 01 777 A1    7/2000
DE     19901777         7/2000
(Continued)

OTHER PUBLICATIONS

English translation of International Search Report for corresponding international application, PCT/EP2015/062898, dated Oct. 21, 2015.
(Continued)

*Primary Examiner* — Geoffrey S Evans
(74) *Attorney, Agent, or Firm* — Ronald S. Lombard (57) ABSTRACT

A process to produce a workpiece surface or a groove inner surface on a rod-shaped, especially cylindrical workpiece. From the workpiece, a rotary tool is supposed to be produced. The material removal is done using laser beam pulses, which are directed through a deflection device onto points of incidence within a pulse area with a specified outside contour on the workpiece. Multiple machine axis drives position the workpiece and the deflection device relative to one another so that the pulse area is oriented essentially at right angles to the emission direction of the laser beam pulses and at right angles to the section of the tool surface that has already been produced and that borders the pulse area. While the material is being removed, the at least one machine axis drive moves the pulse area relative to the workpiece along a specified path of motion while maintaining the orientation.

14 Claims, 5 Drawing Sheets

(51) Int. Cl.
  *B23K 26/08* (2014.01)
  *B23K 26/40* (2014.01)
  *B23K 26/082* (2014.01)
  *B23K 101/20* (2006.01)
  *B23K 103/18* (2006.01)

(52) U.S. Cl.
  CPC ...... *B23K 26/0823* (2013.01); *B23K 26/0861* (2013.01); *B23K 26/40* (2013.01); *B23K 2101/20* (2018.08); *B23K 2103/18* (2018.08)

(56) References Cited

U.S. PATENT DOCUMENTS

| | | | | |
|---|---|---|---|---|
| 2009/0114628 | A1* | 5/2009 | DiGiovanni | B23K 26/0823 219/121.72 |
| 2011/0095005 | A1* | 4/2011 | Brunner | B23K 26/0823 219/121.69 |
| 2011/0097162 | A1* | 4/2011 | Gey | B23K 26/38 407/30 |
| 2011/0220625 | A1* | 9/2011 | Pluss | B23K 26/0823 219/121.72 |
| 2013/0153554 | A1* | 6/2013 | Duerr | B23K 26/0676 219/121.69 |
| 2014/0291307 | A1* | 10/2014 | Saegmueller | B23K 26/0823 219/121.72 |
| 2015/0028007 | A1* | 1/2015 | Pluss | B24B 53/00 219/121.69 |
| 2019/0351490 | A1* | 11/2019 | Brohede | B23K 26/40 |

FOREIGN PATENT DOCUMENTS

| | | |
|---|---|---|
| DE | 10 2010 011 508 A1 | 9/2011 |
| DE | 10 2011 116 974 A1 | 5/2013 |
| EP | 0 191 203 A2 | 8/1986 |
| EP | 0 870 578 A1 | 10/1996 |
| JP | S54-69896 A | 6/1979 |
| JP | 2007-216 327 A | 8/2007 |
| JP | 2011-200 935 A | 10/2011 |
| JP | 2013-508 168 A | 3/2013 |
| JP | 2013-91905 A | 5/2017 |

OTHER PUBLICATIONS

Office Action for a corresponding Japan patent application, i.e., Japan Patent Application No. 2016-575956, Patent Office, dated Feb. 19, 2019. (1 page).

English translation of the Office Action of the Japanese Patent Office dated Feb. 26, 2019, for corresponding Japan Patent Application No. 2016-575956 "Notice of Reasons for Rejection". (2 pages).

* cited by examiner

PROCESS TO PRODUCE A WORKPIECE SURFACE ON A ROD-SHAPED WORKPIECE

CROSS-REFERENCE TO RELATED APPLICATION

This is a continuation-in-part application of pending international application PCT/EP2015/062898 filed Jun. 10, 2015 and claiming the priority of German Application No. 10 2014 109 613.4 filed Jul. 9, 2014. The aforesaid pending international application PCT/EP2015/062898 and German Application No. 10 2014 109 613.4 are both incorporated herein by reference as though fully set forth.

BACKGROUND OF THE INVENTION

The invention relates to a process to produce a workpiece surface using a machining machine with a laser that produces laser beam pulses. The machining machine additionally has a laser head that directs the laser beam pulses of the laser onto the workpiece. A machine drive unit with at least one machine axis drive orients and moves, through the respective associated machine axis drive, the workpiece and the laser head relative to one another in at least one translational and/or rotational degree of freedom.

Such a machining process is disclosed by DE 10 2010 011 508 A1, for example. This process produces a rotary tool during the machining of the workpiece. The laser beam pulses of the laser are directed onto a pulse area using a deflection device or a laser scanner of the laser head, and, within this pulse area, they are directed onto points of incidence along a specified pulse path. The pulse area is moved along the surface of the workpiece by the machine drive unit. This relative motion between the pulse area and the cylindrical workpiece is parallel to the machined surface of the workpiece, for example in the axial direction, and material is removed layer by layer. This allows the depth of the material removal to be increased layer by layer, to produce a groove, for example. The pulse area moves multiple times from the beginning of the groove to its end, and back to the beginning of the groove, this movement being repeated until the groove is finished.

A similar process is also disclosed in DE 10 2010 011 508 A1. This process also produces a contour on a workpiece, in particular a cutting edge or a flank, by defining a pulse area with multiple points of incidence for laser beam pulses, this pulse area then being moved through the machine axis drive along the workpiece surface, to remove material layer by layer, and finally to expose a surface on the workpiece.

DE 10 2011 116 974 A1 discloses a process for laser cutting of a workpiece or of a tool which has cutting tools applied to it that are rotationally moved about the tool's longitudinal axis when it is being operated. The cutting tools are supposed to have a chamfer. To accomplish this, a laser beam is oriented at right angles to the longitudinal axis. The workpiece is then moved by a rotation so that the cutting tools are rotated on a circular path, to which the laser beam runs tangentially. The multiple cutting tools applied to the workpiece are supposed to be rotated one after the other, so to speak, into the focal point of the laser, causing material to be removed on the cutting tools one after the other. This material removal can have a movement in the axial direction superimposed on it, so that the chamfer can be produced along the axial edge of the cutting tool.

EP 0 870 578 A1 describes an abrasive tool and a process to produce it. This tool contains abrasive grains, for example of diamond or other abrasive, hard materials. A laser is used to produce holes or grooves in the flat outside of these abrasive grains 11, to form sharp corners and edges.

Producing tool surfaces, for example groove inner surfaces, on a rod-shaped workpiece using a pulsed laser is difficult. Using the above-described process, in which a pulse area is moved over the workpiece surface transverse to the emission direction of the laser beam pulses, it is possible to achieve high removal rates. However, in some cases the workpiece surfaces that are produced, which have laser beam pulses impinge on them, have insufficiently low roughness. Although other known processes have satisfactory surface quality, they achieve only low removal rates, so that these processes are only suitable for removing small volumes of material.

Therefore, processes are sought which first of all allow the production of a workpiece surface, for example a groove inner surface, that has a very low roughness on all surface sections, which do so without finishing of the workpiece surface produced when the material is removed, and also allow high material removal rates.

SUMMARY OF THE INVENTION

The invention relates to a process to produce a workpiece surface (23) or a groove inner surface (25) on a rod-shaped, especially cylindrical workpiece (11). From the workpiece (11), a rotary tool (40) is supposed to be produced. The material removal to produce the workpiece surface (23) is done using laser beam pulses (B), which are directed through a deflection device (14) onto points of incidence (31) within a pulse area (22) with a specified outside contour (K) on the workpiece (11). Multiple machine axis drives (18) position the workpiece (11) and the deflection device (14) relative to one another in such a way that the pulse area (22) is oriented essentially at right angles to the emission direction (R) of the laser beam pulses and at right angles to the section of the tool surface (23) that has already been produced and that borders the pulse area (22). While the material is being removed, the at least one machine axis drive (18) moves the pulse area (22) relative to the workpiece (11) along a specified path of motion (38) while maintaining the orientation. This is accomplished by a process having the features of the claims.

The inventive process is designed to machine a rod-shaped workpiece. The unmachined workpiece has an overall cylindrical shape, wherein different axial sections can have different cross sections. In particular, the unmachined workpiece is rotationally symmetric about its longitudinal axis. Only once the machining is done according to the inventive process does a non-rotationally symmetric shape arise. After the machining, a cross-sectional surface can result that is point-symmetric to the longitudinal axis. Cylindrical workpieces should be understood to mean not only circular cylindrical workpieces, but rather also other cylindrical shapes that have any curved and/or angular cross sectional contour.

The workpiece is machined using a machining machine with a laser. The laser produces laser beam pulses, which are passed on to a laser head. The laser head has a deflection device, for example a laser scanner, and serves to emit the laser beam pulses in a specified direction. A control unit controls the laser head or the laser scanner in such a way that the laser beam pulses are directed at points of incidence within a pulse area. The outside contour and the positions of the points of incidence within the pulse area are programmed or can be selected by an operator from a preprogrammed library that is present. The laser beam pulses are directed in a specified sequence onto the points of incidence within the pulse area. Every point of incidence within a sequence can be selected once, or also several times one after the other. If the specified sequence is completed, this sequence begins again, or another specified sequence is executed, for example if the outside contour of the pulse area changes during the machining.

The laser beam pulses preferably have a pulse duration of less than 12 ps.

The machining machine also has a machine drive unit with at least one machine axis drive. Each machine axis drive is designed to move the laser head and a tensioning device for the workpiece relative to one another in one degree of freedom. Preferably, multiple machine axis drives are present, so that there can be relative motion between the workpiece and the laser head in multiple degrees of freedom. The degrees of freedom can be translational or rotational. Thus, a total of up to six degrees of freedom are possible, of which up to three each can be rotational or translational.

Thus, while the laser head or the laser scanner each direct the laser onto the points of incidence within the specified pulse area, the machine drive unit simultaneously positions and or orients and/or moves the tensioning device with the workpiece relative to the laser head or to the region of focus in which the laser head produces the pulse area.

The process involves putting the workpiece into a initial position relative to the laser head. The initial position depends on what workpiece surface is supposed to be produced on the workpiece. The longitudinal axis of the workpiece can be oriented parallel to or at an angle of tilt of especially less than 90° with respect to the emission direction of the laser beam pulses. In this application, the emission direction of the laser beam pulses is understood to be a direction coming from the laser head parallel to its optical axis. The laser beam pulses run essentially parallel to this optical axis, however can also be oriented at an angle depending on the distance of the pulse area from the laser head and the size of the pulse area viewed at right angles to the optical axis, this angle being less than 10°, and preferably less than 5° with respect to the optical axis.

Before, during, or immediately after the positioning of the workpiece in the initial position, the pulse area for the machining is specified or selected, it being possible for the pulse area to change during the course of the machining. The pulse area includes the specification or selection of the outside contour and the points of incidence arranged within the pulse area and/or the sequence or order in which a laser beam pulse is directed onto the points of incidence.

Once the pulse area for the machining has been specified or selected and the workpiece is in the initial position, the laser beam pulses are produced through the laser and emitted in the specified manner onto the points of incidence of the pulse area by corresponding control of the laser head. The pulse area is located at the place on the workpiece where the current material removal should be done. The material is removed by laser ablation.

It is decisive that during the material removal the laser beam pulses are oriented exclusively tangentially to a workpiece surface to be produced by the machining. Here the word "tangential" is understood to mean that the real direction of propagation of a laser beam pulse deviates by a maximum of the far-field divergence angle, preferably by a maximum of half the far-field divergence angle, from the tangent that touches the workpiece surface that has been or is being produced at the current material removal site. The divergence angle is the aperture angle of the laser beam or the laser beam pulse between the focal plane at the pulse area and focusing optics of the laser head.

In other words, the workpiece surface, for example a groove inner surface, is produced by removing the material within the outside contour of the pulse area along the workpiece surface to be produced. At the current material removal site, the pulse area is always oriented essentially at right angles to the workpiece surface to be produced, or to the section of the workpiece surface that has already been produced. As the material removal progresses, the pulse area is preferably not moved through the machine drive unit at an angle to or at right angles to the emission direction. The pulse area bores its way, so to speak, into the workpiece, in the emission direction of the laser beam pulse.

The cross sectional contour to be removed, for example the cross sectional contour of a groove, can be exclusively specified by the outside contour of the pulse area. The cross sectional contour to be removed is preferably determined exclusively by the deflection device of the laser head, while the orientation of the longitudinal axis of the workpiece and the movement of the current material removal site on the workpiece opposite the emission direction is determined exclusively by the machine drive unit. Alternatively, the outside contour of the pulse area can also be smaller, in at least one dimension, than the cross sectional contour of the groove to be produced, and be displaced with respect to the workpiece in this at least one dimension, for which purpose it is preferably possible to use only the machine drive unit, or alternatively the deflection device can be used in addition or exclusively.

The machine drive unit produces a relative motion of the workpiece with respect to the laser head in one or more translational or rotational degrees of freedom along a specified path. Thus, the pulse area is moved along a specified path of motion relative to the workpiece, to produce the workpiece surface.

In this process, the laser beam pulses that impinge on the workpiece are oriented exclusively tangentially, as defined above, to an already produced section of the workpiece surface to be produced. At the current material removal site, the already produced workpiece surface runs tangentially to the incident laser beam pulses. This causes unevenness in the already produced workpiece surface to be eliminated by the laser beam pulses which impinge on the workpiece along the outside contour of the pulse area bordering the already produced workpiece surface. This makes it possible to produce a workpiece surface, especially a groove inner surface, with very low roughness However, the very largest part of the heat of the laser beam pulses is input into the material within the pulse area that is to be removed. A heat-affected zone on the workpiece surface that is produced, which could have a negative effect on the material properties, and could make the material brittle, for example, is not formed. Thus, the pulse area formed by the laser beam pulses represents a drill bit with a changeable cross section that is adjustable in any way and that is progressively moved through the workpiece along the workpiece surface to be produced. Preferably, all areas of the workpiece onto which laser beam pulses impinge during machining in the production of the workpiece surface are removed. Thus, no surfaces on the workpiece remain that are too rough due to the laser cutting, and therefore require finishing. Thus, the workpiece surface and a groove inner surface of a groove that is produced can be produced with low roughness, and this can be done in a single pass, without further finishing.

The process is suitable especially for the production of workpiece surfaces, at least sections of which are curved in one or more spatial directions, such as, for example, groove inner surfaces of straight or spiral grooves. Especially when straight grooves are being produced, it can be necessary to incline the direction of propagation of the laser beam pulses with respect to the tangents to the workpiece surface to be produced by at least half the divergence angle, to avoid the workpiece shading the laser beam pulses.

In addition, it is advantageous if the outside contour of the pulse area is changed during the machining. The geometry of the outside contour can maintained and the area of the pulse area increased or decreased, that is, the pulse area can be scaled, so to speak. Alternatively or additionally, it is possible to change the shape or outside contour. For example, a curved section of the outside contour can be changed into an angular section, or vice versa. This makes it possible to produce complex geometries, for example, changing groove cross sections. In addition, it is possible, for example, to produce a workpiece surface whose cross section is curved on one axial section, and is straight or has corners, at least in sections, on another axial section. A corresponding programming or control of the laser head and the machine drive unit can realize such an adaptation.

The outside contour of the pulse area preferably has a section which coincides with a section of the cross sectional contour of the workpiece at the material removal site.

The process is especially suitable to machine workpieces that have at least two or even more workpiece sections, each workpiece section consisting of a different material and/or having different absorption characteristics for the laser light that is used. For example, the workpiece can have a shaft and a workpiece tip made of diamond fastened to the shaft. It is also possible for the workpiece to have a coating made of another material on one end. In such tools, the workpiece surface is produced in a continuous process sequence, in particular one that is uninterrupted in both workpiece sections. For example, a groove can run through both an attached workpiece tip, and also through the adjacent shaft in the axial direction or in the shape of a spiral around the longitudinal axis of the workpiece. The workpiece sections can be arranged one after the other in the axial and/or radial direction with respect to the longitudinal axis of the workpiece.

The two workpiece sections can be connected with one another in a suitable way, in particular by material bonding, for example by an adhesive or by soldering. If a materially bonded connection is used, the two workpiece sections can have a connection layer between them that is made of an adhesive or solder. In this case, the groove is also continuously produced through the connection layer between the two workpiece sections.

The fact that the laser beam pulses run tangential to an already produced section of the workpiece surface following the current material removal site in the pulse area, means that a change in the materials or absorption characteristics of the workpiece has no negative influence, or only a small negative influence on the surface quality of the workpiece surface that has been or is being produced.

To simplify control of the laser head or the laser scanner, the distance between all immediately adjacent points of incidence in the pulse area can, in one sample embodiment, remain unchanged during production of the workpiece surface. Depending on the outside contour of the pulse area, not all points of incidence arranged within the pulse area must have the same separation.

In one sample embodiment, the workpiece surface can be formed by a groove inner surface. Consequently, the machining of the workpiece produces a groove in the workpiece. This groove is produced starting from a first groove end. The pulse area corresponds to the groove cross section to be produced in each case. In particular, the second groove end opposite the first groove end is produced last of all.

In one sample embodiment, the groove depth is varied by the process. In particular, the groove depth at the second groove end can decrease, for example it can steadily decrease until the groove inner surface merges into the outside surface of the workpiece.

Preferably, the outside contour of the pulse area when the second groove end is produced can be different from the outside contour of the pulse area when the first groove end is produced. For example, the outside contour of the pulse area when the first groove end is produced can have an elliptical arc or a circular arc, while the outside contour of the pulse area when the second groove end is produced has a course that is straight at least in sections, and can also form one or more corners.

It is also advantageous if the energy input per unit area by the laser beam pulses impinging in the pulse area is different in an edge zone of the pulse area from the energy input per unit area in a core zone of the pulse area. The energy input per unit area is preferably smaller in the edge zone than in the core zone. The edge zone is the area of the pulse area that directly borders the already produced section of the workpiece surface. The core zone of the pulse area is separated from this already produced section of the workpiece surface. This measure can ensure that the area of the workpiece surface that has been or is being produced does not have any heat-affecting zone that has a negative effect on the material properties. This can be adjusted, for example, by the density or the separation of the points of incidence in the edge zone with respect to the core zone.

This process can be used to produce a tool from a workpiece on which the machining has produced a flank and/or a rake face and/or a groove inner surface.

It is also possible to use the process described above only for smoothing operations. A workpiece surface or a groove inner surface can be produced by any premachining process to leave an oversize, and the inventive process can be used for subsequent production of the desired specified geometry. This can be especially advantageous when the volume of material to be removed is relatively large. This makes it possible, for example, to produce a sharp edge, for example a cutting edge, on the edge of the workpiece surface.

BRIEF DESCRIPTION OF THE DRAWINGS

Advantageous embodiments of the process follow from the dependent claims, the description, and the drawing. Preferred sample embodiments of the process are explained below on the basis of the attached drawing. The figures are as follows:

DETAILED DESCRIPTION OF THE PARTICULAR EMBODIMENTS

Figure 1:
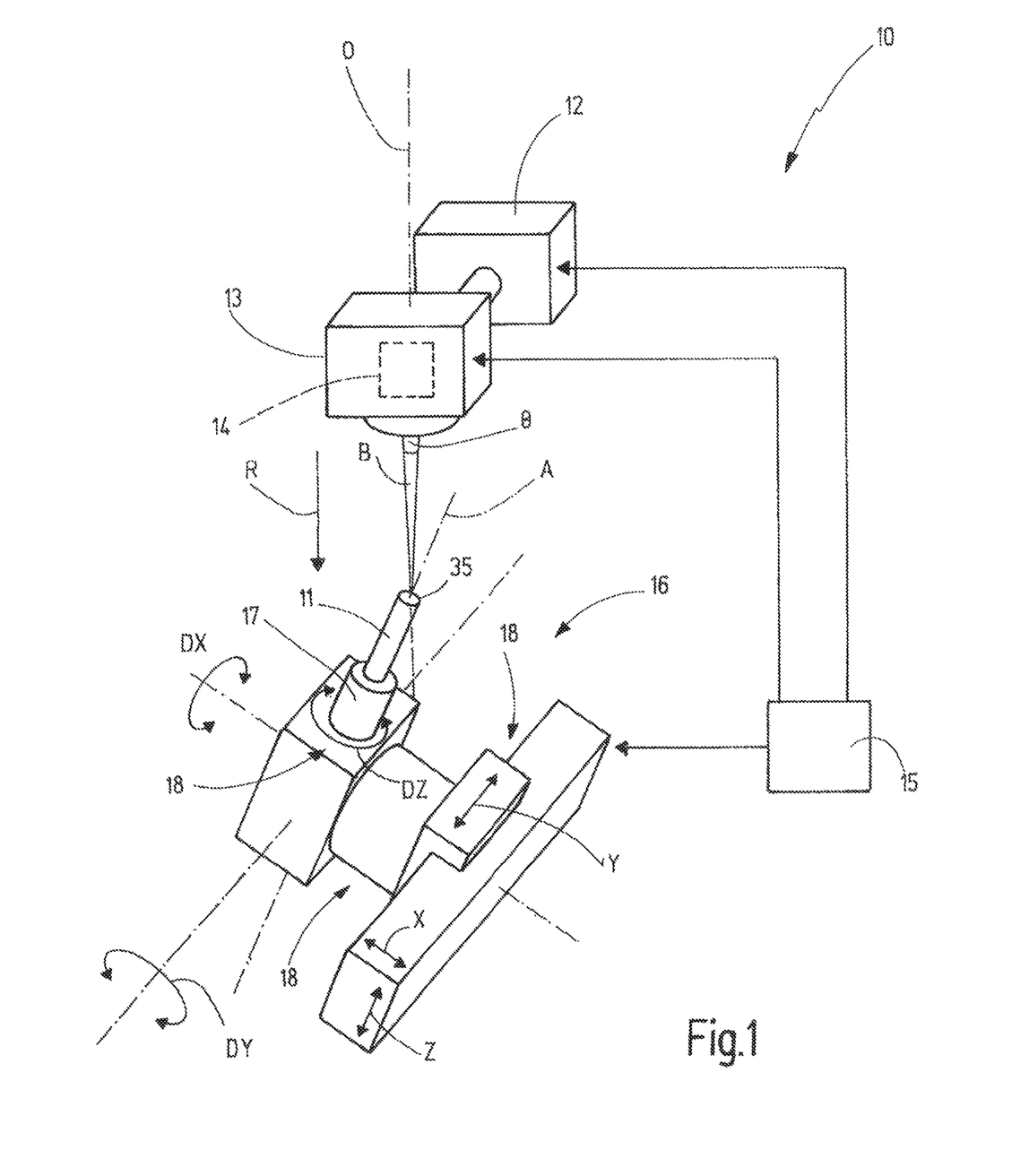
FIG. 1 is a schematic representation of a machining machine that is designed to perform the inventive process.

FIG. 1 schematically illustrates a machining machine 10, which is designed to perform an inventive process to machine a rod-shaped workpiece 11. The unmachined workpiece 11 has a cylindrical shape; according to the example it is circular cylindrical. Machining the workpiece 11 with machining machine 10 produces a rotary tool that rotates about the longitudinal axis A of the workpiece 11 or the tool produced from it.

The machining machine 10 has a pulsed laser 12 that produces a pulsed laser beam, that is laser beam pulses B. The pulsed laser beam is sent from laser 12 to a laser head 13. The laser head 13 is designed to emit the laser beam pulses B in a specified direction with respect to its optical axis O, and focus them in a machining area. While the workpiece 11 is being machined, the currently machined surface of the workpiece 11, that is the material removal site or the material removal surface, is located within the machining area.

The laser head 13 can have focusing means, such as optical lenses or means of that kind. This gives the laser beam pulse B a divergence angle θ, which is schematically illustrated in FIG. 1. The divergence angle in the far field is, so to speak, the aperture angle of the laser beam pulse from the focusing means of the laser head 13 to the machining area. The laser head 13 also has a deflection device 14, which can also be referred to as a laser scanner. The deflection device 14 can have, for example, one or more deflection mirrors, and it serves to adjust the exit direction of the laser beam pulses B with respect to the optical axis O.

The machining machine 10 has a control unit 15 to control the laser 12 and the laser head 13.

The control unit 15 also controls a machine drive unit 16 of the machining machine 10. The machine drive unit 16 is designed to produce a relative motion between the laser head 13 and a tensioning device 17 to tension the rod-shaped workpiece 11 in the machining machine 10. The machine drive unit 16 produces a relative motion between the tensioned workpiece 11 and the laser head 13.

To orient and/or position and/or move the tensioning device 17 relative to the laser head 13 or vice versa, the machine drive unit 16 has one machine axis drive 18 for each translational degree of freedom X, Y, Z that is present and for each rotational degree of freedom DX, DY, DZ that is present; FIG. 1 only very schematically illustrates part of the machine axis drives 18. The number of the translational and/or rotational degrees of freedom X, Y, Z, DX, DY, DZ can vary, it being possible to provide a total of up to six degrees of freedom.

Alternatively to the representation in FIG. 1, the laser head 13 can also be moved through one or more machine axis drives 18 in one degree of freedom for each drive. The only decisive thing is the relative motion of the workpiece 11 or the tensioning device 17 with respect to the laser head 13.

The laser beam pulses B are directed in an emission direction R from the laser head 13 onto the workpiece 11. The area of the workpiece surface onto which the laser beam pulses B impinge and in which material removal takes place is defined by a pulse area 22. The pulse area 22 is produced by the deflection device 14.

Figure 3:
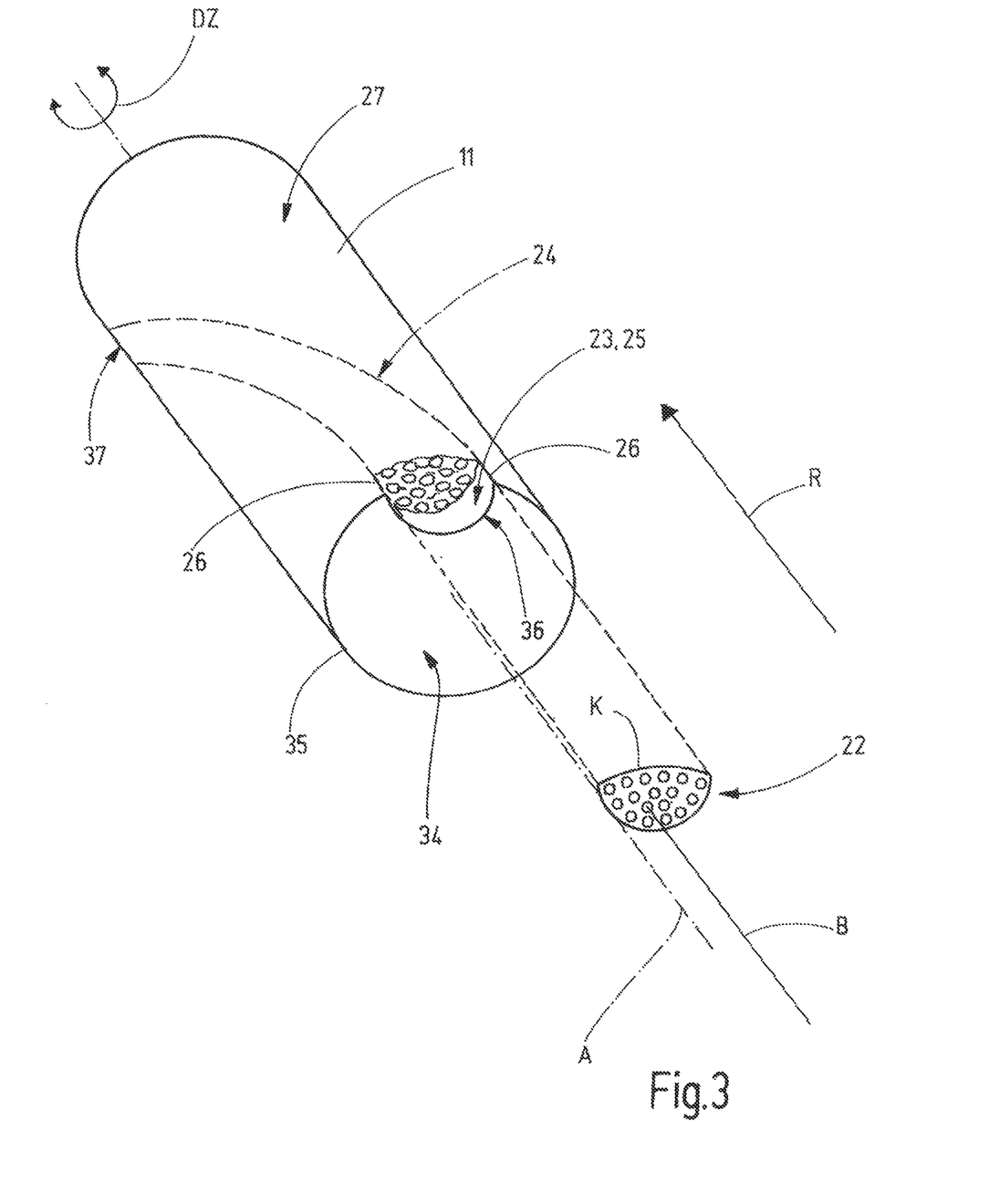
FIG. 3 is a schematic perspective representation of a rod-shaped workpiece during machining in which the outside contour of a pulse area specified for the machining is illustrated.
Figure 4:
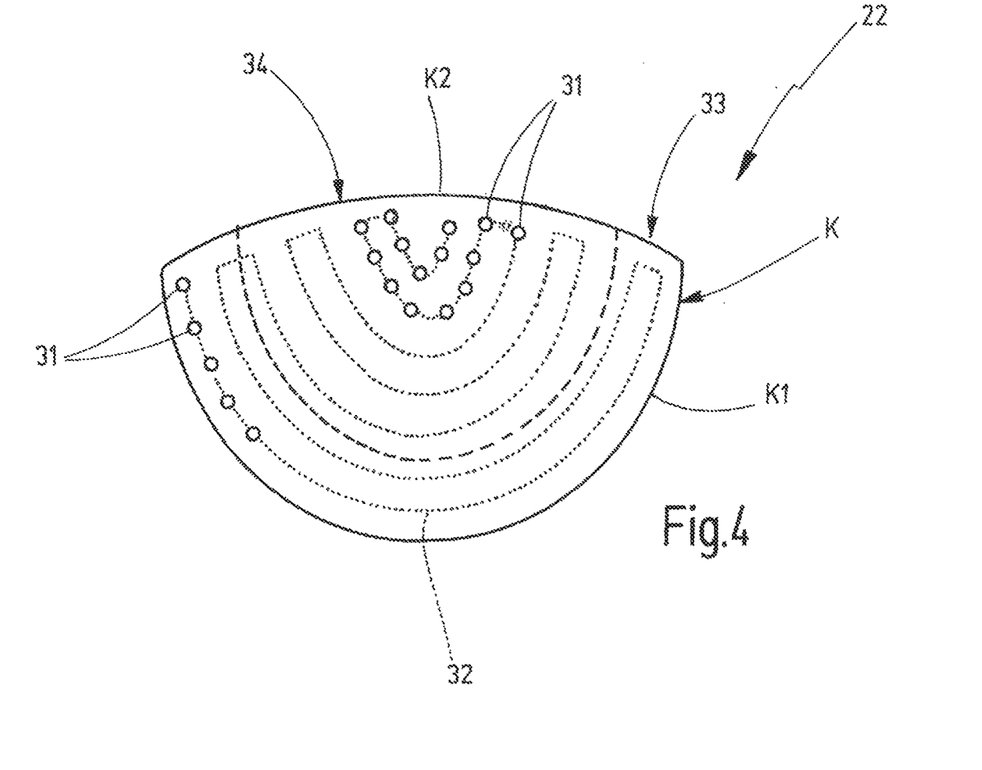
FIGS. 4 and 5 are each schematic top views of an example of a pulse area.
Figure 5:
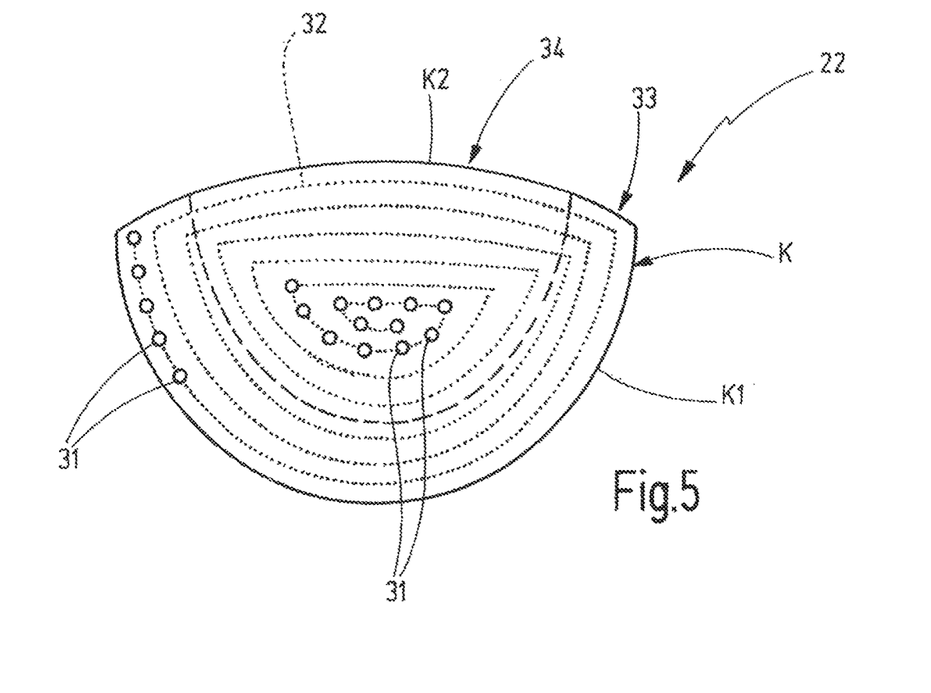

Examples of the pulse area 22 can be seen especially in FIGS. 3 through 5. The pulse area 22 has an outside contour K. The outside contour K is selected or specified in such a way that the outside contour K matches, that of, a workpiece surface 23 to be produced.

In the sample embodiment described here, the workpiece 11 has at least one groove 24 produced on it that has a groove inner surface 25. The groove inner surface 25 is the entire surface resulting during production of the groove 24. That is, in this case, the workpiece surface 23 to be produced is formed by the groove inner surface 25. In the sample embodiment, the groove to be produced 24 is shaped like a channel at every point when viewed in cross section. In the sample embodiment, the two groove edges 26 at which the groove 24 merges into the original outside surface 27, have the same radial distance from the longitudinal axis A. The groove to be produced 24 can run straight in the direction of the longitudinal axis A or—as illustrated here—be in the shape of a spiral around the longitudinal axis A. For example, it can be a groove for chips on the tool 40 to be produced from the workpiece 11.

Alternatively to the described groove 24, it is also possible to use the machining machine 10 and the inventive process to produce, on the workpiece 11, other surfaces, for example flanks or rake faces bordering a cutting edge.

The outside contour K of the pulse area 22 corresponds to a material cross section that borders the workpiece surface 23 to be produced and is supposed to be removed from workpiece 11. Thus, in the sample embodiment described here, the outside contour K of the pulse area 22 corresponds to the groove cross section of the groove 24 to be produced. According to the example, the outside contour K has a first outside contour section K1, which directly borders the cross-sectional surface 23 to be produced, that is here the groove inner surface 25 during the workpiece machining. The outside contour K also has a second outside contour section K2 that corresponds, at least in for instance one cross sectional contour section, to the original workpiece cross sectional contour (the original outside surface 27 of the workpiece) during the machining of the workpiece 11. In the sample embodiment, both outside contour sections K1, K2 are curved and abut one another, forming two corners. Depending on the geometry to be produced, according to the example the groove geometry, it is also possible for the outside contours K to have straight sections, or to have combinations of straight or curved sections.

Multiple points of incidence 31 are located within the outside contour surface K. The points of incidence 31 are arranged distributed within the outside contour K. The distance between directly adjacent points of incidence 31 can be uniform within the pulse area 22 or vary. This depends first on the geometry of the outside contour K and second on whether the energy input per unit area within the pulse area 22 should be uniform or irregular. For every outside contour K the control unit 15 can have a defined arrangement of the points of incidence 31 specified and/or stored in it. The control unit 15 controls the deflection device 14 during the machining of the workpiece 11 in such a way that the laser beam pulses B during a sequence are directed onto the points of incidence 31 within the outside contour K in a specified order. After the end of a sequence, at least one laser beam pulse is directed onto every point of incidence 31. This sequence is cyclically repeated. For example, the laser beam pulses can be moved along a pulse path 32 from one point of incidence 31 to the next point of incidence 31. FIGS. 4 and 5 schematically illustrate two sample embodiments of such pulse paths 32. The pulse path 32 according to FIG. 4 meanders within the pulse area 22, while the pulse path 32 has a spiral-shaped course, for example. Other pulse paths 32 or sequences or orders deviating from this to direct the laser beam pulses B onto the points of incidence 31 are possible.

The pulse area 22 can have an edge zone 33 that is drawn in dashed lines in FIGS. 4 and 5. The edge zone 33 borders on the first outside contour section K1. The surface sections of the pulse area 22 not belonging to the edge zone 33 form a core zone 34 that is thus separated from the first outside contour section K1. In the sample embodiment, the energy input per unit area in the edge zone 33 can be smaller than in the core zone 34 of the pulse area 22. At least the energy input per area of the laser beam pulses directed onto the points of incidence 31 in the edge zone 33 is smaller than a specified maximum value. This ensures that when material is removed during the machining of the workpiece 11, too great an energy input in the area of the edge zone 33 does not produce any heat-affected zone on the workpiece surface 23 to be produced or the groove inner surface 25. Such a heat-affected zone can make the material of the workpiece 11 brittle and therefore require a finishing of the workpiece surface 23 that is produced. By contrast, the core zone 34 is sufficiently separated from the first outside contour section K1 and consequently from the material areas of the workpiece 11, which later form the workpiece surface 23, that in the core zone 34 the energy input per unit area can be selected to be greater than in the edge zone 33.

The energy input per unit area can be varied, for example, by, changing the density of the points of incidence within the pulse area 22, that is within the edge zone 33 or the core zone 34. Alternatively or additionally, parameters of the laser 12 can also be changed, for example the duration of a laser beam pulse B and/or the laser power.

The process to produce the tool surface 23 using the machining machine 10 is as follows:

The machine drive unit 16 is used to put the unmachined workpiece 11 in an initial position with respect to the laser head 13. During the process, the control unit 15 controls the machine drive unit 16 to move and/or orient the workpiece 11 relative to the laser head 13. The sequence of motions is specified, and especially programmed in the control unit 15. The suitable process sequences for a certain workpiece type can be called from a library, for example. Depending on the workpiece surface or workpiece geometry to be produced, the control unit 15 also controls the laser head 13 or the deflection device 14 during the process, to adjust the outside contour K of the pulse area 22 associated with each current relative position between the workpiece 11 and the laser head 13. The outside contour K can remain constant during the process, or change. A changing outside contour K can only be carried out in a scaling of the area while maintaining the geometric shape of the outside contour K. Alternatively or additionally, it is also possible for the geometric shape of the outside contour K to be changed.

In the sample embodiment described here, a groove 24 is produced in the original cylindrical workpiece 11. In the area of the face 34 at a free end 35 of the workpiece 11, the groove 24 has a first groove end 36 and, separated from it, an opposite second groove end 37. The groove 24 is produced starting from the free end 35 of the workpiece, so that the first groove end 36 is produced first. Then, the groove 24 is lengthened along the direction of its course starting from the first groove end 36 by material removal, until the second groove end 37 is finally finished.

The machine drive unit 16 always adjusts the distance of the workpiece 11 from the laser head 13 so that the currently machined site of the workpiece 11 lies within the focused working range of the laser beam pulses B. The workpiece 11 is oriented with respect to the emission direction R in such a way that the laser beam pulses B impinge on the workpiece 11 parallel or tangential to the section of the workpiece surface 23 or groove inner surface 25 that is arranged immediately adjacent to the material removal site, that is to the pulse area 22, in the direction opposite the emission direction R. In other words, in a section adjacent to the pulse area 22 or to the points of incidence 31, the laser beam pulses B run tangential to an already produced surface section of the workpiece surface 23 or groove inner surface 25 that directly abuts the pulse area 22. "Tangential" means that the angle between the direction of propagation or the longitudinal central axis of a laser beam pulse B and a tangent touching the surface section of the workpiece surface 23 that is produced directly bordering the material removal site is smaller than the divergence angle $\theta$ or is smaller than half the divergence angle $\theta$.

The pulse area 22 during the machining is specified in such a way that it is always located in a cross sectional plane of the groove 24. During the machining, the pulse area 22 is moved through the workpiece 11 in the direction in which the groove 24 runs, so to speak, starting from the first groove end 36 all the way to the second groove end 37, until the groove 24 has been completely produced. The relative motion required for this is produced by one or more machine axis drives 18 in the corresponding degrees of freedom X, Y, Z, DX, DY, DZ.

At every point in time, the outside contour K of the pulse area 22 can correspond to the cross sectional contour of the groove 24 to be produced. In this case, there is no displacement of the pulse area within a plane in which the pulse area 22 extends. Instead, the pulse area 22 is moved in its normal direction relative to the workpiece 11, and consequently in the emission direction R. Alternatively, it is also possible to select the outside contour K of the pulse area to be smaller in at least one dimension than the cross sectional contour to be produced of the groove 24. In this case, the pulse area is additionally moved or shifted in the cross sectional plane of the groove 24, to achieve the desired cross sectional contour of the groove 24.

While the material is being removed, the relative orientation or relative motion of the workpiece 11 with respect to the laser head 13 moves the pulse area 22, so to speak, along a specified path of motion 38 (FIG. 2) relative to the workpiece 11, according to the example from the first groove end 36 to the second groove end 37.

The result is that the areas of the workpiece 11 on which the laser beam pulses B impinge are completely removed already during, and due to the production of the workpiece surface 23 or the groove inner surface 25. Areas of the surface on which the laser beam pulses B impinge are, as a rule, too rough after production or have been affected by the energy input, that is, the heat. Frequently, the material of the workpiece is brittle there. To remove such a heat-affected zone and/or reduce the roughness, frequently finishing is then done. In the process proposed here this can be dropped. At the material removal site the produced workpiece surface 23 is always oriented essentially at right angles to the pulse area 22, so that where the laser beam pulses B impinge, the bordering workpiece surface 23 that has already been produced is smoothed. If smaller areas there should project into the clear space profile of the pulse area 22, they are removed by the laser beam pulses directed onto the pulse area 22, and the already produced workpiece surface 23 obtains very low roughness. Thus, the workpiece surface 23 can be produced in one pass while the material is being removed.

Figures 6, 7:
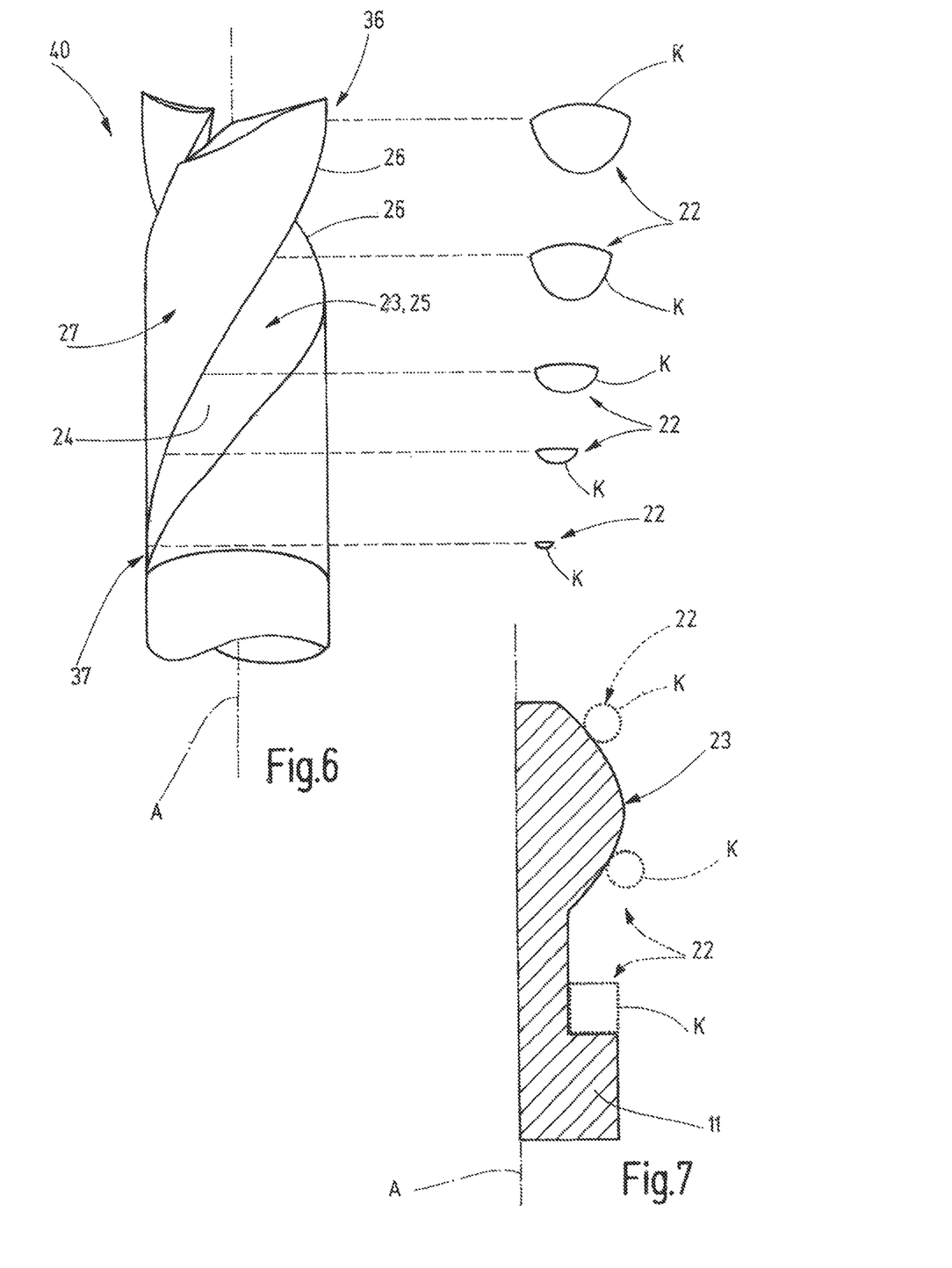
FIG. 6 is a tool produced from a rod-shaped workpiece using the inventive process.
FIG. 7 is a schematic longitudinal section through an example of a workpiece on which a workpiece surface is to be produced, showing its contour and the outside contour of the pulse area which changes during production of the workpiece surface.

FIG. 6 illustrates an example of a tool 40 that is being produced in which multiple grooves 24 are being produced. According to the example, the grooves 24 there are arranged in the shape of a spiral around the longitudinal axis A. While these grooves 24 were being produced, the outside contour K of the pulse area 22 was changed to achieve different groove cross sections at different axial positions relative to the longitudinal axis A of the tool 40. The groove depth and also the groove width decrease starting from the first groove end 36 to the second groove end 37. The respective adjusted outside contour K of the pulse area 22 is schematically illustrated at various axial positions. The channel shape of the groove 24 and consequently of the outside contour K of the pulse area 22 remains the same. At the second groove end 37, the groove inner surface 25 that is produced merges into the original outside surface 27 of the unmachined workpiece 11.

Such a process can very advantageously be used to machine workpieces 11 that have two or more workpiece sections 41 that are made of different materials or that have different absorption characteristics for the laser light that is used. Such a workpiece 11 is illustrated in a very strongly schematized manner and only as an example in FIG. 2. There, the one workpiece section 41 is formed, for example, by a hard metal shaft 42 that has an end piece 43 that forms the other workpiece section 41. The end piece 43 can consist, for example, of a very durable, hard material, such as, for example, diamond. It goes without saying that the workpiece 11 could also have more than two workpiece sections 41.

Figure 2:
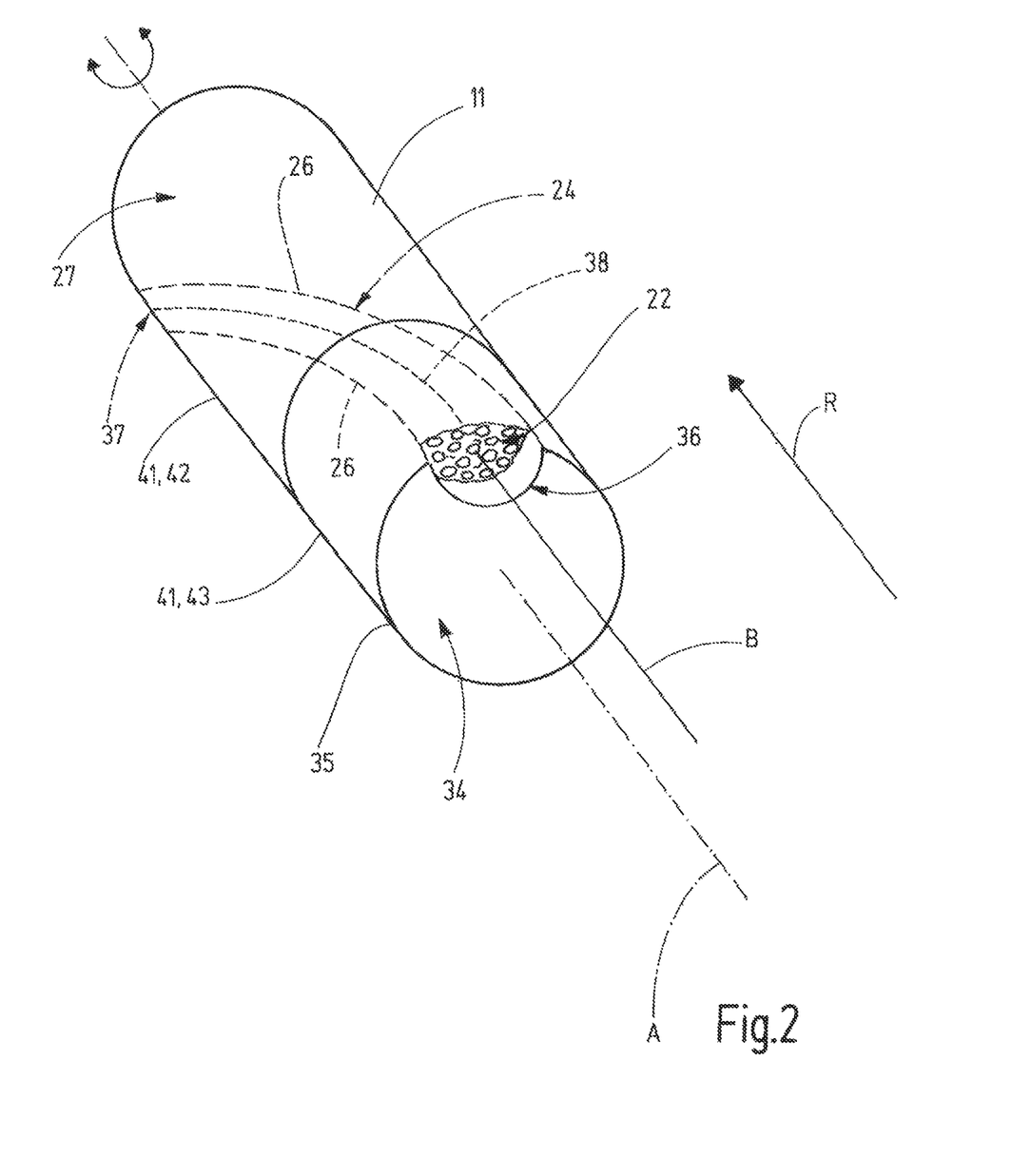
FIG. 2 is a schematic perspective representation of a rod-shaped workpiece during the production of a workpiece surface.

The two workpiece sections 41 can be arranged axially one after the other in the direction of the longitudinal axis A, as illustrated in FIG. 2. Alternatively or additionally, the two workpiece sections 41 could also be arranged one after the other radial to the longitudinal axis A. In other words, they can cross over or overlap in the axial direction and/or in the radial direction. It is also possible to make at least one workpiece section 41 by coating another workpiece section 41.

In the example described here, the two workpiece sections 41 and, according to the example, the hard metal shaft 42 and the end piece 43, are connected with one another, preferably by material bonding. The materially bonded connection can be produced by an adhesive or by soldering. The two workpiece sections 41 can have a connection layer between them that is made of an adhesive or solder.

The fact that the workpiece surface 23 to be produced is produced by laser beam pulses B that are always incident tangential to the workpiece surface 23 to be produced (relative to the material removal site) also allows the material removal to be continuous or uninterrupted through the various workpiece sections 41 with different absorption characteristics. Although the removal rate can vary depending on the absorption characteristics of the respective workpiece section 41, the quality and especially the roughness of the workpiece surface 23 that is produced remains unaffected by this. Thus, it is possible to produce, for example, tools with a hard metal shaft 42 and a tool tip made from the end piece 43, the workpiece surfaces or the grooves 24 that are produced running through both the end piece 43 and also the hard metal shaft 42, as is schematically illustrated in FIG. 2.

In another sample embodiment of the process, in addition to, or as an alternative to the change in the outside contour K according to FIG. 6, it is also possible to change the geometric shape of the outside contour K, which is very schematically illustrated in FIG. 7. There, for example, a curved area of the workpiece surface 23 to be produced is produced using a circular outside contour K of the pulse area 22, while a polygonal, according to the example quadrilateral, in particular rectangular or square shape of the outside contour K is used to produce a corner in an end area of the tool surface 23 to be produced. Using such adaptation of the geometry of the outside contour K it is possible, for example, to produce a groove 24 whose second groove end 37 can have edges and/or corners and/or steps on the tool 40.

The invention relates to a process to produce a workpiece surface 23 or a groove inner surface 25 on a rod-shaped, especially cylindrical workpiece 11. From the workpiece 11, a rotary tool is supposed to be produced. The material removal to produce the workpiece surface 23 is done using laser beam pulses B, which are directed through a deflection device 14 onto the workpiece 11 at points of incidence 31 within a pulse area 22 having a specified outside contour K. One or more machine axis drives 18, in particular CNC axes, orient or position or move the workpiece 11 and the deflection device 14 relative to one another so that the pulse area 22 with the points of incidence 31 for the laser beam pulses B arranged within it is oriented essentially at right angles to the emission direction R of the laser beam pulses and at right angles to the already produced section of the tool surface 23 that borders the pulse area 22. While the material is being removed, the at least one machine axis drive 18 moves the pulse area 22 relative to the workpiece 11 along a specified path of motion 38 while maintaining the orientation, that is always at right angles to the immediately adjacent already produced section of the workpiece surface 22. This makes it possible, for example, to produce a groove 24 with a groove inner surface 25 in the direction in which the groove 24 runs, starting from a first groove end 36 at the free end 35 of the workpiece all the way to an opposite free groove end 37. The outside contour K of the pulse area 22 can correspond to the respective cross section to be produced of the groove 24, or at least lie within the cross section to be produced of the groove 24.

LIST OF REFERENCE NUMBERS

10 Machining machine
11 Workpiece
12 Laser
13 Laser head
14 Deflection device
15 Control unit
16 Machine drive unit
17 Tensioning device
18 Machine axis drive
22 Pulse area
23 Workpiece surface
24 Groove
25 Groove inner surface
26 Groove edge
27 Original outer surface of workpiece
31 Point of incidence
32 Pulse path
33 Edge zone 34 Face
35 Free end of workpiece
36 First groove end
37 Second groove end
38 Path of motion
40 Tool
41 Workpiece section
42 Hard metal shaft
43 End piece
θ Divergence angle of laser beam pulses
A Longitudinal axis of workpiece
B Laser beam pulse
DX Rotational degree of freedom
DY Rotational degree of freedom
DZ Rotational degree of freedom
K Outside contour
K1 First outside contour section
K2 Second outside contour section
O Optical axis of laser head
R Emission direction
x Translational degree of freedom
y Translational degree of freedom
z Translational degree of freedom

What is claimed is:

1. A process to produce a workpiece surface (23) comprising a groove inner surface (25) of a groove (24) on a rod-shaped workpiece (11) using a machining machine (10) that has a laser (12) that produces laser beam pulses (B), with a laser head (13) that directs the laser beam pulses (B) of the laser (12) onto the workpiece (11), and with a machine drive unit (16) that has at least one machine axis drive (18) that is configured to move the workpiece (11) and the laser head (13) relative to one another in at least one translational and/or rotational degree of freedom (X, Y, Z, DX, DY, DZ), with the following steps:

Positioning and/or orienting the workpiece (11) relative to the laser head (13);

Specifying and/or selecting a pulse area (22) having an outside contour (K) and points of incidence (31) arranged within the pulse area (22) that are separated from one another, onto which the laser beam pulses (B) from the laser head (13) are emitted in a specified sequence, the outside contour (K) of the pulse area (22) defining a cross-sectional contour to be removed in order to produce the groove inner surface (25) of the groove (24);

Emitting the laser beam pulses (B) through the laser head (13) in an emission direction (R) onto the specified points of incidence (31) within the pulse area (22) on the workpiece (11), wherein, during the machining, the laser beam pulses (B) being oriented tangential to the section of the groove inner surface (25) that is produced by the machining of the workpiece (11) and that borders the pulse area (22);

Moving the laser head (13) and/or the workpiece (11) relative to one another in such a way that the pulse area (22) on which the material removal takes place is moved with respect to the workpiece (11) following a specified path of motion (38) exclusively in the emission direction (R) to produce the groove inner surface (25).

2. Process according to claim 1, characterized in that all workpiece areas adjacent to the groove inner surface (25) that is produced on which laser beam pulses (B) impinge during machining are already completely removed by the production of the groove inner surface (25) and while machining it is taking place.

3. The process according to claim 1, characterized in that the laser beam pulses (B) that are directed onto the points of incidence (31) of the pulse area (22), are oriented tangential at least to the adjacent, already produced section of the groove inner surface (25), and reduce the roughness of this adjacent section of the groove inner surface (25).

4. The process according to claim 1, characterized in that the outside contour (K) of the pulse area (22) is changed depending on the current relative position and/or relative orientation of the workpiece (11) with respect to the laser head (13).

5. The process according to claim 1, characterized in that the workpiece (11) has at least two workpiece sections (41) that have different absorption characteristics for the laser light that is used and that the groove inner surface (25) is produced by a continuous process sequence in the two workpiece sections (41).

6. The process according to claim 5, characterized in that the two workpiece sections (41) consist of parts (42, 43) that are connected with one another by material bonding.

7. The process according to claim 1, characterized in that the distance between immediately adjacent points of incidence (31) in the pulse area (22) remains constant during the production of the groove inner surface (25).

8. The process according to claim 1, characterized in that the groove (24) being produced starting from a first groove end (36).

9. The process according to claim 8, characterized in that the groove (24) has, opposite the first groove end (36), a second groove end (37) that is produced last of all.

10. The process according to claim 9, characterized in that the groove depth decreases in the area of the second groove end (37).

11. The process according to claim 9, characterized in that the outside contour (K) of the pulse area (22) when the second groove end (37) is produced is different from the outside contour (K) of the pulse area (22) when the first groove end (36) is produced.

12. The process according to claim 1, characterized in that energy input of the laser beam pulses (B) per unit area is larger or smaller in an edge zone (33) of the pulse area (22) that borders the groove inner surface (25) that is being produced or that has been produced than in a core zone (34) of the pulse area (22) that is separated from the groove inner surface (25) that is being produced or that has been produced.

13. The process according to claim 1, characterized in that the process produces a tool (40) from the workpiece (11).

14. A process to produce a sharp edge on one edge of a groove inner surface (25) of a workpiece (11), characterized in that first a surface is produced on the workpiece (11) that has an oversize at least around the edge, and then this oversize is removed according to the process according to claim 1.

* * * * *